Jan. 16, 1945.     C. L. OSBORN     2,367,307
WINDSHIELD WIPER
Filed June 19, 1943
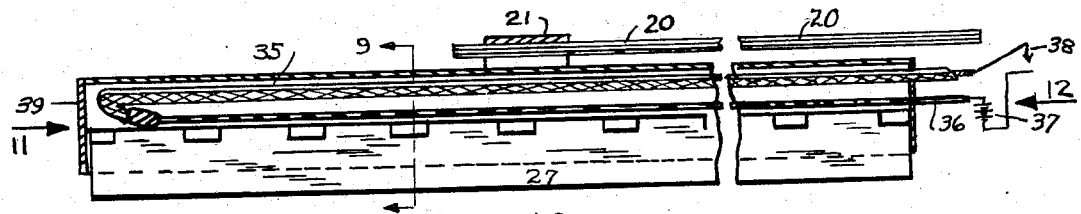
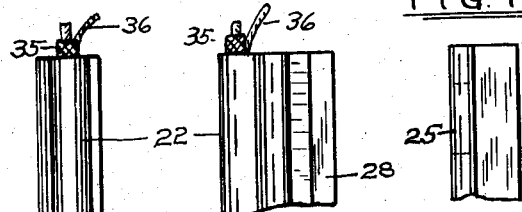

Patented Jan. 16, 1945

2,367,307

UNITED STATES PATENT OFFICE 2,367,307

WINDSHIELD WIPER

Charles L. Osborn, Cheyenne, Wyo.

Application June 19, 1943, Serial No. 491,741

3 Claims. (Cl. 15—250.5)

This invention relates to improvements in windshield wipers of the kind customarily employed in connection with automobiles and airplanes.

Practically every automobile is provided with a mechanism for keeping the windshield free from water and snow and which, briefly described, consists of a squeegee that is oscillated about a pivot by means of a suitable motor. The blade of the squeegee is usually made from soft rubber and in its movement over the surface is very effective in removing water and wet snow.

During the cold seasons when the temperature is below freezing, any little rain, mist or snow tends to form a layer of ice over the windshield, which cannot be removed by the ordinary squeegee wiper. To make the ordinary wipers effective during such freezing weather, it is customary to heat the windshield by means of air circulated about its inner surface.

It is the object of this invention to produce an improved wiper which shall be provided with means for heating the squeegee blades and for directing hot air against the outer surface of the windshield so as to effectively prevent the formation of layers of ice during freezing temperatures.

Another object is to produce a wiper squeegee of such construction that the squeegee blade can be readily applied and removed so as to make it possible to replace a worn out blade without at the same time replacing the housing.

A further object of the invention is to produce a wiper of such construction that it can be heated either by an electrical heating element or by heated air.

A still further object of this invention is to produce a windshield wiper of such construction that the movement of the wiper over the windshield surface produces a suction that tends to draw heated air from the interior of the housing towards the windshield surface.

A still further object is to produce a wiper in which the heat supplied thereto will be conducted to the wiper blade and in addition thereto conveyed by means of air to the windshield surface.

A still further object is to produce a construction in which the housing and the blades can be readily constructed, assembled and disassembled.

The above and other objects which may appear as the description proceeds are attained by means of a construction and an arrangement of parts that will now be described in detail, and for this purpose reference will be had to the accompanying drawing, in which the invention has been illustrated, and in which:

Figure 1 is a front elevation of the wiper or squeegee looking in the direction of arrow 1, Figure 2;

Figure 2 is a side elevation looking in the direction of arrow 2, Figure 1;

Figure 3 is a cross section taken on line 3—3, Figure 1;

Figure 4 is a cross section taken on line 4—4, Figure 1;

Figure 5 is a side elevation of the squeegee blade;

Figure 6 is an elevation of the squeegee blade looking in the direction of arrow 6, Figure 5;

Figure 7 is a cross section taken on line 7—7, Figures 5 and 6;

Figure 8 is a transverse section taken on line 8—8, Figure 5;

Figure 9 is a transverse section to an enlarged scale, taken on line 9—9, Figure 10;

Figure 10 is a longitudinal section taken on line 10—10, Figure 9;

Figure 11 is an end view looking in the direction of arrow 11, in Figure 10;

Figure 12 is an end view looking in the direction of arrow 12, in Figure 10;

Figure 13 is a perspective view of a metal cover member forming part of the construction;

Figure 14 is a view similar to that shown in Figure 9 and shows a modification employing a hot air heater; and Figure 15 is a section taken on line 15—15, Figure 14.

In the drawing the motor operating the wiper has not been shown because it forms no part of this invention. The arm designated by reference numeral 20 is oscillated by any suitable motor and the blade is connected with arm 20 by any of the usual means, one of which has been designated in a diagrammatic manner and indicated by reference numeral 21.

The squeegee or wiper consists of an outer housing 22, of the proper length, which is formed from sheet material either metal or some suitable plastic. The housing is bent into substantially U-shape and the sides 23 are provided on their inner surfaces with opposed grooves 24 that extend longitudinally thereof.

The housing in its completed form has a cross section like that shown in Figures 3, 4, 9 and 14. Positioned between the sides of the housing is a squeegee blade which has been designated in its entirety by reference numeral 25. This blade is formed from rubber or some rubber-like substance, either synthetic rubber or plastic and in the embodiment illustrated, each blade consists of two parts, one of which has been designated by "A" and the other by "B." These two parts may be identical in size and shape. Although the squeegee blade has been shown as formed from two identical complementary members, it is to be understood that it may be molded in a single piece, if desired. The squeegee blade, which will hereinafter be considered as if constructed from a single member, is provided along its inner edge with oppositely extending beads 26, of such size and shape that they will fit snugly in the grooves 24. In the embodiment illustrated, the assembled blade has two thin wiping blades 27 and 28, which are separated from each other by a space 29. Openings 30 extend through the inner portion of the blade and communicate the space 29 with the space 31, which is between the inner edge of the squeegee blade and the closed side of the housing. The squeegee blade is assembled by inserting it longitudinally into the housing and in order to facilitate this operation, the sides of the beads 26 are covered with thin metal members 32 of the shape shown in Figure 13. The convex portions 33 are curved to receive the beads 24 and the flat portions 34 extend downwardly between the thin blades 27, 28 and the sides of the housing. Members 32 are preferably made from some good heat conducting material, such as copper or aluminum.

Positioned in the space 31 is an electric heating element 35, which, preferably, consists of a core of Nichrome or some other satisfactory high resistance metal which is covered by an insulating layer of asbestos of other heat and electrical insulating material. In the embodiment illustrated, the heating element 35 consists of a single straight piece whose end is reversely bent and connected with an enamel coated copper wire 36 which forms the return path for the current. If desired the heating element may be formed by a U-shaped member, thereby omitting the return wire 36. The ends of the heating element and the return wire are connected in series with a battery 37 and a switch 38. The switch 38 may be controlled by the operation of the valve or switch that controls the wiper motor.

The ends of the housing are closed by end members 39 and 40 which are shown in Figures 11 and 12. These end members may be secured in place by any suitable means and are preferably so secured that they can be readily removed for the replacement of the squeegee blade. When the wiper is operating the wiping edges of blades 27 and 28 rest against the outer surface of the windshield, which has been designated by reference numeral 41 in Figures 9 and 14.

Referring now to Figure 9, it will be assumed that the blade is moving in the direction of arrow 42 and the friction between the blades and the windshield bends the blades towards the right into the position shown by the dotted lines. In this position the ends of the wiper blades come into contact and the area between them is greatly decreased. When the blade reverses the area between the blades is again increased to its normal volume thereupon producing a suction that draws heated air from the chamber 31 into the space 29. This heated air comes into direct contact with the windshield and serves to impart heat to it and it also serves to heat the squeegee or wiper blades. Heat is also transmitted to the blade by conduction through the housing wall 22 and the metal member 32. After the wiper assembly gets properly heated, it will not permit snow to adhere to the wiper blades and the heat radiated and conducted from the wiper blade to the windshield also serves to heat the latter and by the combined action of these means, sleet and snow is prevented from adhering to the windshield surface.

Although it is contemplated to employ an electric heating element, it is, however, possible to substitute for this a pipe 43 which may be connected with the motor exhaust or with some air heating means by a flexible rubber tubing. Means may be provided for imparting to the air a movement in a direction to cause it to flow through the openings 44 into space 31 and thence into the space 29 between the blades 27 and 28. The pipe 43 may be dispensed with and the air conducted directly into the space 31. Any air introduced into the space 31 will pass through the openings 30 and warm the wiper blades 27 and 28 and also impart heat to the housing and to the windshield.

Particular attention is called to the fact that this squeegee or wiper assembly is so constructed that the blade is introduced through one end thereof and held in position by the interengaging action of the grooves 24 and the beads 25. The metallic cover members 32 are provided to reduce friction and impart rigidity to the wiper blade so that it may be readily inserted into the housing. After the blade is inserted, the end member 39 is replaced thereby closing the space 31.

Attention is also directed in particular to the construction of the wiper blades and directed to the fact that the latter has two spaced wiper blades 27 and 28 which, in addition to their wiping function, also act as pumps to suck air from space 31.

The two-part construction of the wiper blade is also a feature of importance because it simplifies the manufacture. The two parts of the blade are identical and therefore a single mold can be employed in their manufacture. The two parts of the blade can be secured together at least temporarily, by means of suitable rubber cement, if this should be found desirable, in order to facilitate the assembling of the wiper and the insertion of the blades into the housing.

Having described the invention what is claimed as new is:

1. A windshield wiper comprising, an elongated housing of substantially U-shaped cross section, the inner surface of the sides having longitudinally extending grooves positioned between the closed and the open edges of the housing, a squeegee blade having its opposite sides, along its inner edge, provided with beads for engaging in the grooves to position the blade in the housing, the inner edge of the blade terminating a short distance from the closed edge of the housing, whereby an elongated chamber is formed, and an electric heating element in the chamber, the outer edge of the blade terminating in two spaced wiping elements, the blade having openings communicating the chamber containing the heater element with the space between the squeegee elements.

2. An article of manufacture comprising, a two part squeegee blade of rubber-like material, each part of said blade having one edge terminating in a thin flexible wiping element for engaging a surface to be cleaned, the other having a longitudinally extending bead on one side and a plurality of spaced transverse projections on the other side, the two parts being complementary and adapted to be assembled with the transverse projections of one engaging corresponding transverse projection on the other forming openings communicating the beaded edge with the space between the wiping elements.

3. In a windshield cleaner, a wiping element comprising: a holder forming a rigid U-shaped channel; a heating element in the closed side of said channel; a pair of parallel, flexible squeegee blades projecting from the open side of said holder; means on said blades within said holder acting to maintain the projecting portions thereof out of contact with each other and in parallel, spaced apart relation, there being passages through said latter means to allow water to be forced into and out of contact with said heating element by the flexing action of the spaced apart projecting portions of said squeegee blades.

CHARLES L. OSBORN.